Figure 4:
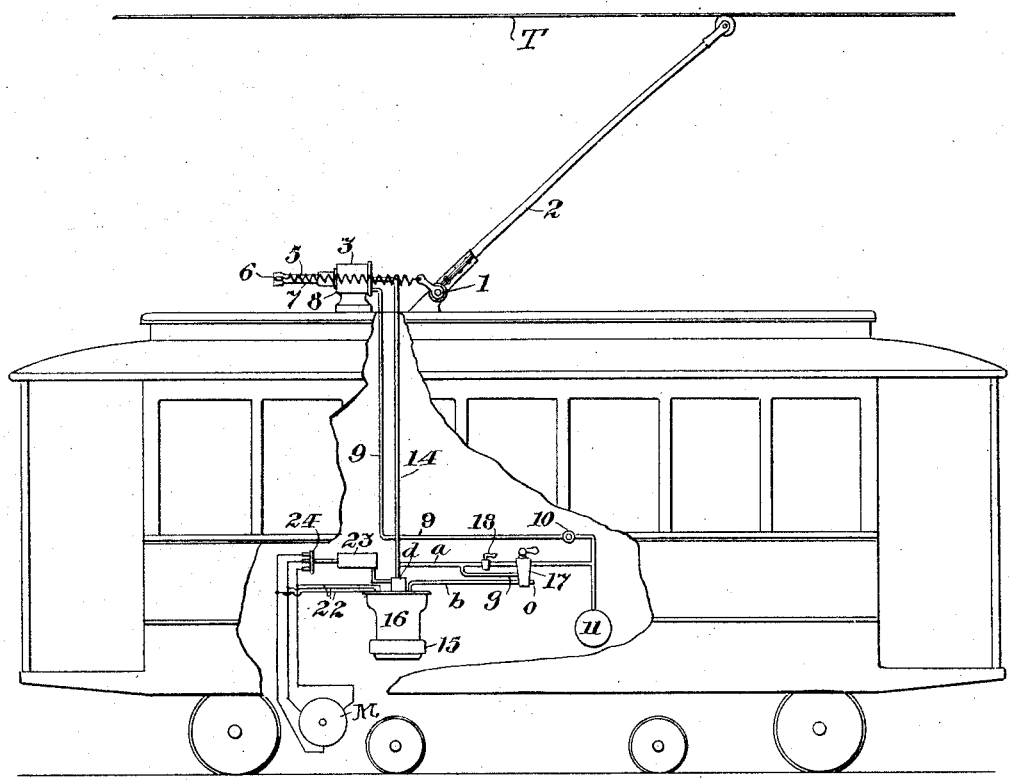

No. 875,822. PATENTED JAN. 7, 1908.
C. DE KANDÓ.
PRESSURE DEVICE FOR ELECTRIC CURRENT COLLECTORS.
APPLICATION FILED NOV. 27, 1903.
2 SHEETS—SHEET 1.
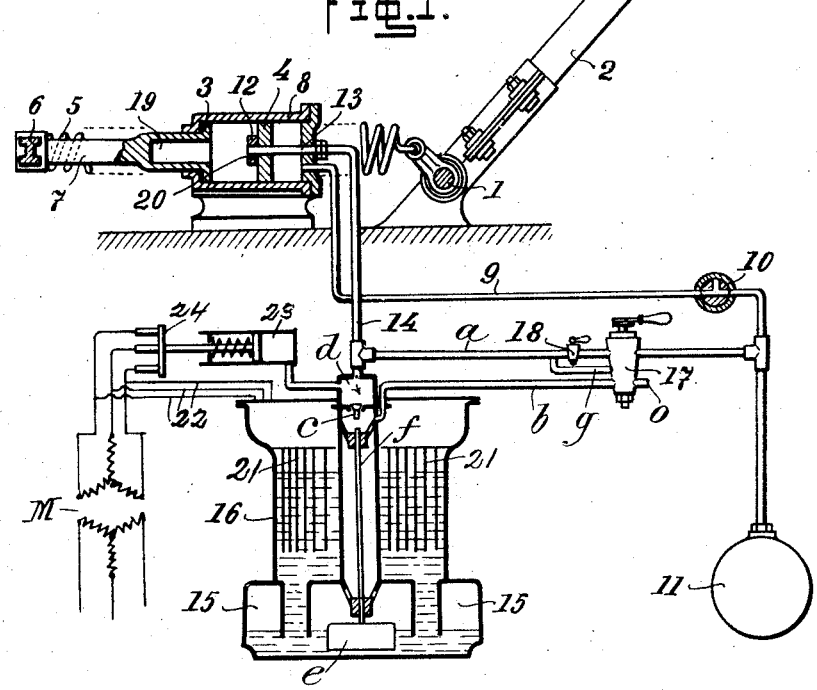
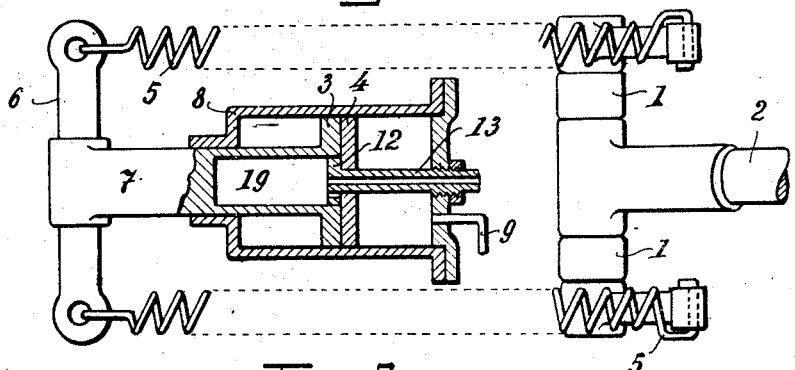
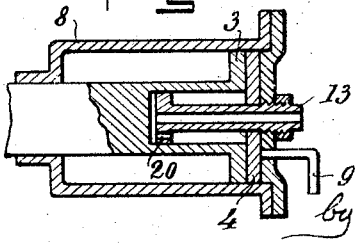

No. 875,822. PATENTED JAN. 7, 1908.
C. DE KANDÓ.
PRESSURE DEVICE FOR ELECTRIC CURRENT COLLECTORS.
APPLICATION FILED NOV. 27, 1903.

2 SHEETS—SHEET 2.

UNITED STATES PATENT OFFICE.

COLOMAN DE KANDÓ, OF BUDAPEST, AUSTRIA-HUNGARY, ASSIGNOR, BY MESNE ASSIGNMENTS, TO WESTINGHOUSE MACHINE COMPANY, A CORPORATION OF PENNSYLVANIA.

PRESSURE DEVICE FOR ELECTRIC-CURRENT COLLECTORS.

No. 875,822.     Specification of Letters Patent.     Patented Jan. 7, 1908.

Application filed November 27, 1903. Serial No. 182,701.

*To all whom it may concern:*

Be it known that I, COLOMAN DE KANDÓ, a subject of the Emperor of Austria-Hungary, and resident of Budapest, in the Empire of Austria-Hungary, have invented certain new and useful Improvements in Pressure Devices for Electric-Current Collectors, of which the following is a specification.

My present invention relates to improvements in pressure regulators for electric current collectors and it consists of certain novel parts and combinations of parts particularly pointed out in the claims concluding these specifications.

The efficient pressure with which a trolley is pressed against the trolley wire depends, on the one hand, upon the upward force applied to the trolley pole and, on the other hand, upon the inertia and air resistance acting on the trolley and trolley pole when the car is running. The effect of inertia and air resistance varies with the speed of the car and, other things being equal, the effective pressure of the trolley on the trolley wire will diminish as the speed increases. It is desirable, however, that the trolley pressure should remain substantially constant at all speeds or, at least, should not materially diminish at high speeds. My present invention is directed, among other things, to this result.

In the accompanying drawings I have shown my invention applied in one of its simplest forms, at present preferred by me, the illustrations being partly diagrammatic; but it will be understood that various modifications and changes may be made in the structure and mode of operation without departing from the spirit of my invention and without exceeding the scope of my claims.

In said drawings Figure 1 is a view partly in section; Figs. 2 and 3 are detailed views on an enlarged scale; Fig. 4 shows a trolley car with parts broken away, showing one form of my invention applied thereto.

The following is a description of the structure shown in the drawings:

2 is a trolley pole shown broken off. 3 is the pivot about which said pole turns.

5 are springs at one end attached to the base of the trolley pole and at the other end to a cross head 6.

8 is a cylinder within which is a piston 4 sliding freely on a hollow tube 13, provided at its inner end with an abutment 12. Within the cylinder is a supplemental piston 3 bored out at 19 with a cavity in which the abutment 12 may enter.

20 is a hole through the abutment 12.

11 is a reservoir of compressed air connected with the rear end of the cylinder 8 by a pipe 9, controlled by a three way cock in one position establishing communication between the rear end of the cylinder 8 and the reservoir 11, and in another position establishing communication between the rear end of cylinder 8 and the open air.

15, 16 is a liquid rheostat, of well known construction operated by compressed air and employed in starting polyphase motors.

14 is a pipe communicating with the interior of the cylinder 8 in front of the piston 4 and with the reservoir of compressed air 11. This pipe is controlled by the valve 17 and a throttle valve 18.

The operation of the device may be thus described: When the trolley pole is depressed and not in contact with the trolley wire T (Fig. 4), the pistons 3, 4, within the cylinder 8 are in the position shown in Fig. 3. To elevate the trolley pole and to press the trolley against the trolley wire with the initial force adapted for conditions of slower speeds, the valve 10 is turned so as to place the rear end of the cylinder 8 in communication with the source of compressed air 11. The pistons 4 and 3 are thereby advanced to the position shown in Fig. 2 and the springs 5, 5, are put under the requisite tension. To press the trolley against the trolley wire with a force corresponding, or adapted to higher speeds, the valve 17 is operated, admitting compressed air from the reservoir 11 through pipe 14 to the space in the cylinder in front of the piston 4, whereby the piston 3 is forced forward or advanced to the position shown in Fig. 1, whereby the springs 5 are placed under greater tension for the purposes previously described. On returning to lower speeds the cock 17 is operated to cut off the compressed air supply and to open communication with the atmosphere, when piston 3 will return to the position shown in Fig. 2, the hole 20 in the abutment 12 preventing the undue compression of air in cavity 19. To lower the pole the valve 10 is operated to cut off the compressed air supply and to open communication with the atmosphere, when piston 3 and 4 will return to the position shown in Fig. 3.

The pressure of the trolley against the wire may be automatically varied by the mechanism used to control the speed of the cars, and I have therefore shown as a diagrammatic illustration of this feature of my invention, a well known form of compressed air liquid rheostat 15, 16 such as is used for starting and regulating the speed of induction motors, connected in the system in such a way that the valve 17 which admits compressed air to the trolley cylinder 8, simultaneously admits air to the liquid rheostat chamber 15 to elevate the liquid in chamber 16 and thus to diminish the resistance through the secondary of the motor and increase its speed.

It is not necessary to describe here in detail the construction and operation of the liquid rheostat 16, such liquid rheostats being now well known in the art and shown in patents heretofore granted to me No. 677,454 and No. 733,971.

Briefly stated, the rheostat is shown in connection with a three-phase motor M. At starting the resistance of the rheostat is included in the secondary circuit of the motor by means of the leads 22. On starting the valve 17 is set in such position that compressed air from the reservoir 11 flows to the chamber $d$ of the rheostat by way of pipe $a$. At this time the pipes $g$ and $b$ and the outlet $o$ are closed by the valve 17. The throttle valve 18 is set so as to control the flow of compressed air through pipe $a$. Compressed air in a slow current thus enters the chamber $d$ of the rheostat and flows down past the check valve $c$ into the chamber 15. At this time the level of the water is so high in chamber 15 that the rod $f$, controlled by the float $e$, holds the check valve $c$ off its seat. This condition continues until so much water has been expelled from chamber 15 into chamber 16 that the float $e$ falling permits the check valve $c$ to close. The compressed air, still continuing to flow through the pipe $a$ into the chamber $d$, having no exit, will increase the pressure in this chamber, and in the chamber 23, forcing outwardly the short-circuiting device 24, which, when in the position shown, short-circuits the secondary of the motor, which is then a normal full-speed condition.

When it is desired to stop the motor, the valve 17 is turned to such a position that it closes the passage through pipe $a$ and opens the passage through pipes $b$ and $g$ and connects them both with the outlet $o$. The air will then escape from the chamber $d$ through the pipes $a$ and $g$ and the outlet $o$ until the short-circuiting device returns to its normal position. At the same time the compressed air stored in the chamber 15 will escape through the pipe $b$ and outlet $o$, so that the water will rise in chamber 15 and fall in chamber 16 until the stem $f$ of the float $e$ abuts against, and lifts the valve $c$ off its seat. The apparatus is then in a condition ready for starting.

Of course it will be understood that my invention is not limited to the use of such a motor or such a resistance as is diagrammatically shown in the drawings.

By operating the valve 18 the motor, assumed in this case to be an induction motor, may be run at lower speeds, during which condition there will not be in pipe 14 a pressure sufficient to force the piston 3 forward. When, however, the speed of the induction motor is brought up to maximum, the pressure rapidly rises in pipe 14 and thus forces forward the piston 3 to the position shown in Fig. 1.

Having thus described one embodiment of my invention and the form at present preferred by me, what I claim is:

1. The combination with an electric vehicle, of an electric conductor, an electric current collector, an electric motor for propelling said vehicle, a controller, and means for automatically pressing said collector toward said conductor with relatively low pressure when the controller is set for starting or for running at relatively low speed, and for automatically pressing said collector toward said conductor with relatively high pressure when the controller is set for running at relatively high speed.

2. The combination with an electric vehicle, of an electric conductor, an electric current collector, an electric motor for propelling said vehicle, a controller, and means independent of the current flowing to the motor for automatically pressing said collector toward said conductor with relatively low pressure when the controller is set for starting or for running at relatively low speed and for automatically pressing said collector toward said conductor with relatively high pressure when the controller is set for running at relatively high speed.

3. The combination with an electric vehicle, of an electric conductor, an electric current collector, an electric motor for propelling said vehicle, a speed controller and means operable from the controller for pressing said collector toward said conductor with relatively low pressure when the controller is set for starting or for running at relatively low speed, and for automatically pressing said collector toward said conductor with relatively high pressure when the collector is set for running at relatively high speed.

4. The combination with an electric vehicle, of means for propelling said vehicle, an electric conductor, an electric current collector, and unitary means independent of the current flowing to the motor for varying the speed of the vehicle and simultaneously varying the pressure of the collector against the conductor.

5. The combination with an electric vehicle, of an electric conductor, a current collector, fluid-operated means for pressing said collector toward said conductor, and means for regulating the pressure of said fluid whereby the pressure of the collector against the conductor is regulated.

6. The combination with an electric vehicle, of an electric conductor, a current collector, fluid-operated means for pressing said collector toward said conductor, a controller for varying the speed of the vehicle, and means operated from said controller for varying the pressure of said fluid whereby the pressure of the collector against the conductor is varied.

7. The combination with an electric vehicle, of an electric conductor, a current collector, a controller, fluid-operated means controlled by said controller for varying the speed of the vehicle, and fluid operated means simultaneously controlled by said controller for varying the pressure of said collector against said conductor.

8. The combination of an electric conductor, an electric current collector, a supply of compressed fluid, a piston controlled by compressed fluid and connected with said collector to raise and maintain said collector in contact with said conductor and a supplemental piston controlled by compressed fluid and connected with said collector to vary the force exerted to press said collector against said conductor.

9. The combination with a motor of an electric conductor, an electric current collector, a supply of compressed air, means operated by compressed air for controlling the speed of the motor, means operated by compressed air for varying the force exerted to press the collector against the conductor and mechanism for simultaneously controlling the flow of compressed air with respect to both said means.

10. In an electrically propelled vehicle, a current collector having a contact-carrying arm, a spring acting when under stress to press said arm toward a current conductor, a supply of compressed fluid, a cylinder, a piston in said cylinder for putting said spring under stress when acted upon by said compressed fluid, connections for supplying the compressed fluid behind said piston with a superior pressure independent of the spring stress, a stop limiting the motion of said piston, a second piston, and means for causing compressed fluid to act upon it with a controlled pressure to vary the stress of said spring.

11. The combination with an electric vehicle, a conductor, and a current collector, of a motor, a switch for said motor, means for exerting fluid pressure on the switch to operate the latter, and means for simultaneously exerting fluid pressure upon the collector to press the latter against the conductor.

12. The combination with an electric vehicle, of a conductor, a current collector, a motor, a switch mechanism for such motor, means for applying fluid pressure to the switch mechanism to operate the latter, a piston operatively connected with the collector, means for applying fluid pressure to said piston to operate the latter, and cause the collector to bear against the conductor, and a controlling mechanism for controlling the operating means of both the switch and the piston of the collector.

13. In an electric vehicle the combination of a conductor, a current collector, a motor, a switch mechanism for the motor, pneumatical means for operating said switch, and pneumatical means for pressing the collector against the conductor, and a controller common to both the pneumatical switch-operating means and the pneumatical collector pressing means.

In witness whereof I have hereunto set my hand in the presence of two witnesses.

COLOMAN DE KANDÓ.

Witnesses:
   EUGENE HERSANYE,
   T. LA GUARDIA.